(12) United States Patent
Guo (10) Patent No.: US 6,982,658 B2
(45) Date of Patent: Jan. 3, 2006

(54) KEYPAD LAYOUT FOR ALPHABETIC SYMBOL INPUT

(75) Inventor: Jin Guo, Sunnyvale, CA (US)

(73) Assignee: Motorola, Inc., Schaumburg, IL (US)

( * ) Notice: Subject to any disclaimer, the term of this patent is extended or adjusted under 35 U.S.C. 154(b) by 429 days.

(21) Appl. No.: 09/814,663

(22) Filed: Mar. 22, 2001

(65) Prior Publication Data

US 2002/0135499 A1    Sep. 26, 2002

(51) Int. Cl.
*H03M 11/00*    (2006.01)
(52) U.S. Cl. .............................. 341/28; 341/20; 341/22; 345/168; 345/171; 400/484; 379/433.07; 379/368
(58) Field of Classification Search ................. 341/20, 341/22, 28, 23; 400/484; 345/168, 171; 379/433.07, 368; 715/536
See application file for complete search history.

(56) References Cited

U.S. PATENT DOCUMENTS

| | | | | |
|---|---|---|---|---|
| 5,212,638 A | * | 5/1993 | Bernath ....................... 715/535 |
| 5,410,306 A | * | 4/1995 | Ye ............................... 341/28 |
| 5,893,133 A | * | 4/1999 | Chen ........................... 715/535 |
| 5,952,942 A | * | 9/1999 | Balakrishnan et al. ........ 341/20 |
| 5,954,437 A | * | 9/1999 | Wen-Hung ................... 400/487 |
| 6,005,498 A | * | 12/1999 | Yang et al. .................... 341/23 |
| 6,073,146 A | * | 6/2000 | Chen ........................... 715/535 |
| 6,281,884 B1 | * | 8/2001 | Chang et al. ................ 345/171 |
| 6,356,258 B1 | * | 3/2002 | Kato et al. ................... 345/168 |
| 6,362,752 B1 | * | 3/2002 | Guo et al. .................... 341/28 |
| 6,562,078 B1 | * | 5/2003 | Yang et al. .................. 715/535 |
| 6,636,163 B1 | * | 10/2003 | Hsieh ........................... 341/28 |

\* cited by examiner

*Primary Examiner*—Albert K. Wong
(74) *Attorney, Agent, or Firm*—Hisashi D. Watanabe (57) ABSTRACT

Layouts for keypads are provided that have an improved combination of a regular of intuitive arrangement of alphabetic symbols of a language defined by letter characters of the Roman alphabet and an efficient distribution of the symbols to minimize input ambiguities. More particularly, the symbols are for the Pinyin alphabet which includes two main symbol groups thereof for forming Pinyin syllables. The various layouts employ a columnar-based arrangement for the symbols of the initial group. The symbols for the final group are parsed down to basic characters and are distributed in a row-based arrangement.

4 Claims, 12 Drawing Sheets

|   | I | U | V |
|---|---|---|---|
| A | IA | UA |   |
| E |   | UO |   |
| O | IE |   | VE |
| AI |   | UAI |   |
| EI |   | UEI |   |
| AO | IAO |   |   |
| OU | IOU |   |   |
| AN | IAN | UAN | VAN |
| EN | IN | UEN | VN |
| ANG | IANG | UANG |   |
| ENG | ING | UENG |   |
| ONG | IONG |   |   |

28 *FIG. 3*

| SEMI-INITIAL | W | Y | NOTHING |
|---|---|---|---|
| STARTING SOUND | U | I,V | A,O,E |

26 *FIG. 4*

| EH | ER |
|---|---|

30 *FIG. 5*

| TYPE 1 | INITIAL(21) | FINAL(35) |
|---|---|---|
| TYPE 2 | SEMI-INITIAL(2) | FINAL(35) |
| TYPE 3 | INDEPENDENT(2) | |

*FIG. 6*

| PINYIN STANDARD | Ê | Ü |
|---|---|---|
| THIS DOCUMENT | EH | V |

*FIG. 7*

| UNIT | REGULAR SPELLING | SIMPLIFIED SPELLING | REGULAR SPELLING | SIMPLIFIED SPELLING |
|---|---|---|---|---|
| SYLLABLE | YVE | YUE | JV | JU |
| SYLLABLE | YVAN | YUAN | QV | QU |
| SYLLABLE | YVN | YUN | XV | XU |
| FINAL | IEN | IN | IOU | IU |
| FINAL | VEN | VN | UEI | UI |
| FINAL | IENG | ING | UEN | UN |

| REGULAR FINALS | UEI | IOU | UEN | IEN | IENG | VEN |
|---|---|---|---|---|---|---|
| IN TYPE-1 | UI | IU | UN | IN | ING | VN |
| IN TYPE-2 | WEI | YOU | WEN | YIN | YING | YUN |
| EQUIVALENT FINALS | EI | OU | EN | IN | ING | UN |
| REGULAR FINALS | V | VE | VAN | VN | | UENG |
| IN TYPE-1 | V | VE | NOT-IN-USE | | | |
| IN TYPE-2 | YU | YUE | YUAN | YUN | | WENG |
| EQUIVALENT FINALS | U | UE | UAN | UN | | ENG |

FIG. 10

|    | A  | O    | E   | I   | U  | V  | N   | NG   |
|----|----|------|-----|-----|----|----|-----|------|
| A  |    | AO   |     | AI  |    |    | AN  | ANG  |
| O  |    |      |     |     | OU |    |     | ONG  |
| E  |    |      |     | EI  |    |    | EN  | ENG  |
| I  | IA | IONG | IE  |     | IU |    | IN  | ING  |
| U  | UA | UO   | UE  | UI  |    |    | UN  |      |
| V  |    |      | VE  |     |    |    |     |      |
| IA |    | IAO  |     |     |    |    | IAN | IANG |
| UA |    |      |     | UAI |    |    | UAN | UANG |

FIG. 11

|   |    | IA | IAN | IANG | IAO |   | UA | UAI | UAN  | UANG |      |
|---|----|----|-----|------|-----|---|----|-----|------|------|------|
| 1 | B  | D  | B/D |      | B/D | 3 |    |     | D    |      | D    |
| 4 | P  |    | P/T |      | P/T | 3 |    |     | T    |      | T    |
| 7 | M  |    | M/N | N    | M/N | 3 |    |     | N    |      | N    |
| * | F  | L  | L   | L    | L   | 2 |    |     | L    |      | L    |
| 2 | G  | J  | J   | J    | J   | 3 | G  | G   | G/J  | G    | J    |
| 5 | K  | Q  | Q   | Q    | Q   | 3 | K  | K   | K/Q  | K    | Q    |
| 8 | H  | X  | X   | X    | X   | 3 | H  | H   | H/X  | H    | X    |
| 0 | ZH |    |     |      |     | 2 | ZH | ZH  | ZH/Z | ZH   | Z    |
| 6 | CH |    |     |      |     | 2 | CH | CH  | CH/C | CH   | C    |
| 9 | SH |    |     |      |     | 2 | SH | SH  | SH/S | SH   | S    |
| # | R  |    |     |      |     | 1 |    |     | R    |      |      |
| 0 | W  |    |     |      |     | 1 |    |     | Y    |      | Y    |

| | | IA | IAN | IANG | IAO | N | | | NG | UA | UAI | UAN | UANG | |
|---|---|---|---|---|---|---|---|---|---|---|---|---|---|---|
| 1 | B | D | B/D | | B/D | AN | 3 | A | 2 ANG | | | D | | D |
| 4 | P | | P/T | | P/T | IN | 3 | I | 2 ING | | | T | | T |
| 7 | M | | M/N | N | M/N | | 2 | N | 1 | | | N | | N |
| * | F | L | L | L | L | | 1 | | 1 | | | L | | L |
| 2 | G | J | J | J | J | | 1 | O | 2 | G | G | G/J | G | J |
| 5 | K | Q | Q | Q | Q | UN | 2 | U | 2 | K | K | K/Q | K | Q |
| 8 | H | X | X | X | X | | 1 | | 2 | H | H | H/X | H | X |
| 0 | ZH | | | | | EN | 1 | E | 3 ENG | ZH | ZH | ZH/Z | ZH | Z |
| 6 | CH | | | | | | | V | 2 | CH | CH | CH/C | CH | C |
| 9 | SH | | | | | | | NG | 2 | SH | SH | SH/S | SH | S |
| # | R | | | | | | | | 1 | | | R | | |
| 0 | W | | | | | | | | 1 | | | Y | | Y |

*FIG. 14*

|   |   | IA | IAN | IANG | IAO |   | UA | UAI | UAN | UANG |   |
|---|---|----|-----|------|-----|---|----|-----|-----|------|---|
| 1 | B | D  | B/D |      | B/D 2 |   |    |     |     |      |   |
| 4 | P |    | P/T |      | P/T 2 |   |    |     |     |      |   |
| 7 | M |    | M/N | N    | M/N 2 |   |    |     |     |      |   |
| * | F | L  | L   | L    | L 1   | 1 |    |     | D   | D    |   |
| 2 | G | J  | J   | J    | J 1   | 1 |    |     | T   | T    |   |
| 5 | K | Q  | Q   | Q    | Q 1   | 1 | G  | G   | N   | N    |   |
| 8 | H | X  | X   | X    | X 1   | 2 | K  | K   | L   | L    |   |
| 0 | ZH|    |     |      |       | 2 | H  | H   | G/J | G    |   |
| 6 | CH|    |     |      |       | 2 | ZH | ZH  | K/Q | K    |   |
| 9 | SH|    |     |      |       | 2 | CH | CH  | H/X | H    |   |
| # | R |    |     |      |       | 2 | SH | SH  | ZH/Z| ZH   |   |
| 0 | W |    |     |      |       | 1 |    |     | CH/C| CH   |   |
|   |   |    |     |      |       | 1 |    | R   | SH/S| SH   |   |
|   |   |    |     |      |       |   |    |     | R   |      |   |
|   |   |    |     |      |       |   |    |     | Y   | Y    |   |

|   | A | O | E | I | U | V | N | NG | AO | AI | AN | ANG |
|---|---|---|---|---|---|---|---|----|----|----|----|-----|
| A |   | AO |   | AI |   |   | AN | ANG |   |   |   |   |
| O |   |   |   |   | OU |   |   | ONG |   |   |   |   |
| E |   |   |   | EI |   |   | EN | ENG |   |   |   |   |
| I | IA | IONG | IE |   | IU |   | IN | ING | IAO |   | IAN | IANG |
| U | UA | UO | UE | UI |   |   | UN |   |   | UAI | UAN | UANG |
| V |   |   | VE |   |   |   |   |   |   |   |   |   |

FIG. 20

|   | A | O | E | I | U | V | AN | ANG | ONG |
|---|---|---|---|---|---|---|----|-----|-----|
| N | AN |   | EN | IN | UN |   |   |   |   |
| NG | ANG | ONG | ENG | ING |   |   |   |   |   |
| I |   |   |   |   |   |   | IAN | IANG | IONG |
| U |   |   |   |   |   |   | UAN | UANG |   |

|   | A | O | E | I | U | V |
|---|---|---|---|---|---|---|
| A |   | AO |   | AI |   |   |
| O |   |   |   |   | OU |   |
| E |   |   |   | EI |   |   |
| I | IA |   | IE |   | IU |   |
| U | UA | UO | UE | UI |   |   |
| V |   |   | VE |   |   |   |

*FIG. 21*

|   | AO | AI |
|---|----|----|
| I | IAO |   |
| U |   | UAI |

| FIGURE NUMBER | KEYPAD NAME | BASE LAYOUT | SYMBOLS ADDED | SYMBOLS REMOVED | KEYS AFFECTED |
|---|---|---|---|---|---|
| 1 | BaGoZHe | Pinyin Letters | | | |
| 9 | HuaXia | BaGoZHe | IA,UA | | 8 |
| 13 | NianSHuang | BaGoZHe | IA,UA | | 7,9 |
| 15 | XiaYua | BaGoZHe | IA,UA | | 8,0 |
| 17 | HoaWai | BaGoZHe | AO,AI,AN,ANG | | 8,*,0,# |
| 19 | ManShen | BaGoZHe | AN,ANG,ONG, EN,ENG, IN,ING,UN | N,NG | 7,8,9,*,0,# |

*FIG. 24*

KEYPAD LAYOUT FOR ALPHABETIC SYMBOL INPUT

FIELD OF THE INVENTION

The invention relates to a keypad layout for alphabetic symbol input and, more particularly, to a keypad that has alphabetic symbols arranged and distributed on the keys thereof in a highly regular and efficient manner.

BACKGROUND OF THE INVENTION

The arrangement and distribution of alphabetic symbols or characters on alphanumeric keypads so that the keypad is easy to use and does not create excessive ambiguity in creating multiple words with the same keystrokes is difficult to achieve due to the small size of such keypads. This problem is especially pronounced in those alphabets having greater numbers of symbols than those of Roman-based alphabets, e.g. the twenty-six Roman letter alphabet. The alphabetic character layout is more easily done on keyboards for desktop systems adapted for two-handed input as the keyboard generally has thirty-six alphanumeric keys readily available for symbol placement. As is apparent, the fewer number of keys in keypads complicates layout designs, especially with those languages having large alphabets.

One goal in arriving at a keypad layout is that the symbols appear on the keys in a regular or intuitive arrangement so that users can readily become familiar with where the different symbols are located in the keypad. In this manner, the keypad is easier to use and allows the user to become more proficient in its use for fast and accurate input of the symbols. The other goal is to distribute the symbols efficiently so as to minimize the ambiguity created when a given sequence of key inputs is undertaken to form a word. Ambiguity is created when the same sequence can create multiple words. Each time the user has to go through the process of choosing a word among several, overall input speed and efficiency is slowed particularly where the number of words to be selected is high. Accordingly, it is desirable to distribute the symbols such that a minimum of such multiple word formations can be created from a given sequence of key inputs.

One problem that is noted is that the most efficient distribution of symbols on a keypad may not produce a very regular arrangement for ease of use of the keypad. On the flip side, the most regular arrangement of the symbols on the keys will generally not be the most efficient distribution of the symbols for low input ambiguity. For instance, the typical layout on a keypad for the twenty-six Roman letter alphabet is having the letter symbols appear in alphabetical order on a row-by-row basis (herein referred to as, "the ABC keypad"). As is apparent, this is a highly regular layout that allows a user to quickly become familiar with the location of the letters in the ABC keypad particularly with users having native languages that are read in a left to right fashion. On the other hand, the ambiguity of this layout is very high as commonly used letters appear on the same key and letters that are less commonly used also appear together, e.g. letters G, H, I on key four vs. letters W, X, Y on key nine. So, for example, the same sequence of key inputs that produces the word "good" will also produce six other words for a total of seven possible valid candidates from the same keystroke sequence.

Also, and as mentioned, this problem of finding the optimum balance between regularity and efficiency in the arrangement and distribution of alphabetic characters on a keypad is exacerbated where the number of symbols in the alphabet is higher than that of the Roman alphabet. One such example is Chinese alphabets, and in particular the Romanized phonetic alphabet for (Mandarin) Chinese called "Pinyin". Pinyin evolved from "Bopomofo," a pictorial phonetic alphabet developed early this century for Mandarin Chinese. Pinyin is the only Chinese phonetic alphabet accepted by ISO (International Standard Organization). While Pinyin uses the same twenty-six letters as the Roman alphabet, certain of its symbols are combinations or strings of the Roman letters such that Pinyin has sixty phonetic symbols which creates organizational problems in the small keypad setting, as described above. When discussing the Pinyin alphabet, it will be understood that the term symbol refers to either single or multiple Roman letter characters that stand alone in the Pinyin alphabet as single or compound character symbols, respectively.

Currently, there are no keypad layouts that are specifically designed for Pinyin-based Chinese character text input on hand-held devices, such as mobile phones or the like. Instead, what is in use today is the standard Roman letter alphabet ABC keypad layout as described earlier. Again, while this keypad layout is regular and easy to master, it is not particularly well suited for Pinyin, as it is neither regular nor efficient. The ABC keypad layout does not take advantage of specific regularities found in the Pinyin alphabet nor does it utilize keys economically. Of the twelve keys available, only eight keys (key two to key nine) are utilized for text input. Another problem with the ABC keypad layout is that among the eight text input keys, key five, seven and nine are only used for input of the first or initial letter of a Pinyin syllable, as every letter associated with those keys are consonants. As Chinese is a highly syllabic language as will be described more fully herein, concentration of consonants on a few number of keys invariably leads to ambiguities such as where different consonants combine with the same vowels to each form valid syllable candidates. For example, the key sequence 7-8-6 generates five different Pinyin syllables: "gun," "run," "ruo," "sun," and "suo".

A further problem in efficiency relates to the number of keystrokes required to enter a Pinyin syllable. Because the ABC keypad layout is primarily designed for the Roman alphabet, it does not consider the fact that many of the Pinyin symbols are formed by combinations of Roman characters, as previously mentioned. Accordingly, to address these compound character Pinyin symbols, one has to undertake multiple key inputs. For instance, the Pinyin syllable "zhuang" composed of two Pinyin compound symbols requires six key presses to be entered. Requiring six key presses to enter a single syllable does not produce a very user-friendly keypad layout and slows down textual input speed.

Accordingly, there is a need for a keypad layout having an improved combination of regularity and efficiency for textual input. More particularly, a keypad for Chinese text input, i.e. the Pinyin phonetic alphabet, is needed having a highly regular and efficient layout.

DETAILED DESCRIPTION OF THE PREFERRED EMBODIMENTS

Figure 1:
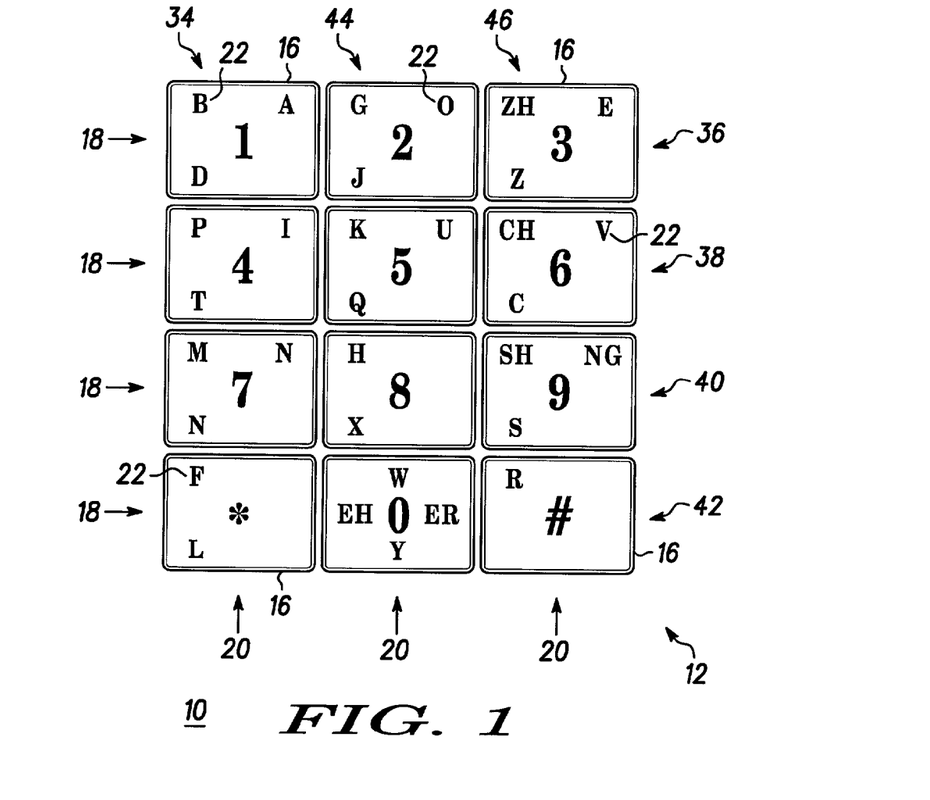
FIG. 1 is a plan view of an alphanumeric keypad having a layout of alphabetic symbols of the Pinyin Chinese phonetic alphabet in accordance with the present invention.

The present layout generally designated 10 for the keypad 12 of FIG. 1 is optimized in terms of both its regularity and efficiency over the prior ABC keypad layout described earlier. In this regard, the keypad layout 10 herein is specifically described for use with the Chinese phonetic alphabet, Pinyin, although it will be recognized that the principles adopted by the keypad layout 10 can also be adapted for use with other types of syllabic based, highly structured languages with alphabets having symbol groupings, as described more fully hereinafter. The present keypad layout finds particular utility on keypads 12 of small hand-held, electronic data entry devices 14 of FIG. 23 such as cellular phones, PDAs, etc. where the number of keys available for alphanumeric input is limited, e.g. 9 to 12 alphanumeric keys.

The keypad layout 10 has a predetermined arrangement of the symbols of one of the groups thereof that is based on a columnar or vertical top down approach rather than the row-by-row approach of the prior ABC keypad layout. The present keypad layout 10 maximizes its regularity as it utilizes the predetermined ordering of the symbols within the sets so their order generally corresponds to the row in which they lie. In other words, the first symbol of the set will appear in the first row of keys and the last symbol of the set will appear in the last or lowest row of keys on which the symbols appear in the column of keys in which the symbol set is distributed. In addition, with respect to the other main group of symbols they are reduced to preselected basic characters for purposes described herein and which are arranged in an order that is intuitive to a native speaker of the syllables and words formed by the symbols. In this manner, the keypad layout 10 will allow a user to become readily familiar with the location of symbols in the keypad 12 so that with use they should be able to increase their speed of symbol input.

The present keypad layout also employs a highly efficient arrangement or distribution of the commonly used symbols from the symbol groups amongst the keys of the keypad 12 so as to minimize the number of words that are formed by a given sequence of key inputs. The symbols from the group having commonly known sets are arranged in predetermined key columns so that symbols from the same set do not appear in different key columns, as discussed. The reduction of the symbols of the other group to preselected characters reduces the number of symbols from this group that needs to appear on the keys. In this manner, the concentration of the symbols on the keys can be minimized which otherwise may tend to create ambiguity in symbol input. Accordingly, the keypad layout 10 herein achieves a balanced distribution of the commonly used symbols from the symbol groups on the keys to provide a minimum of ambiguity in symbol input for a given sequence of key inputs. This will reduce the instances of the underlying circuitry having to display multiple words on the screen of the device which, in turn, requires that the user stop their input and choose the word they intended to enter. As is apparent, this undesirably slows the overall process of symbol data entry. Even if multiple words are possible, their number is reduced with the keypad layout 10 herein contributing to ease and speed of use.

Figure 23:
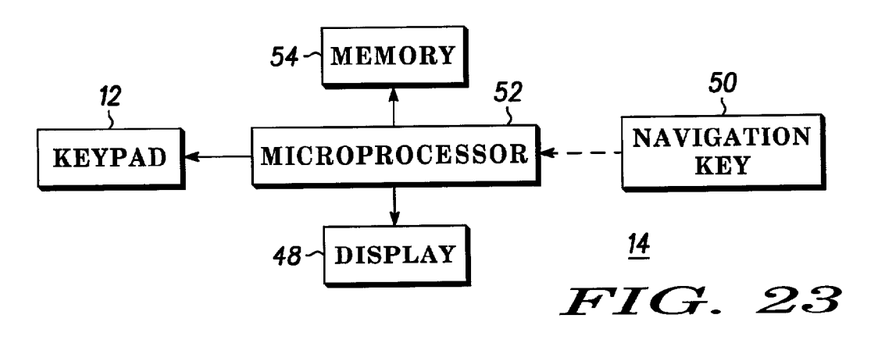
FIG. 23 is a diagrammatic view of the circuitry associated with the data entry device utilizing the keypad and showing a dedicated navigation key separate from the keypad.

As shown in FIG. 1, the keypad layout 10 is implemented on the keypad 12 that is typical for use in handheld wireless electronic devices 14 schematically illustrated in FIG. 23 having a plurality of keys 16 arranged in predetermined numbers of rows 18 and columns 20. The invention herein relates to arranging and distributing symbols 22 of a Chinese phonetic Pinyin alphabet on the keys 16 in a highly regular and efficient manner. Herein, it will be understood upon referencing the symbols 22 being or appearing on the keys 16, that the symbols 22 do not necessarily have to be physically imprinted on the keys 16 but rather can appear adjacent to a particular key 16 so that it is associated therewith, as is known.

In the illustrated form of FIG. 1, the keypad layout 10 is implemented on a four row, three-column keypad 12 having the twelve keys 16 thereof available for the placement of certain ones of the alphabetic symbols 22 thereon, as will be described more fully hereinafter. Alternative keypad layouts are also disclosed for providing certain advantages. In all the keypad layouts herein, the combination of regularity and reduced ambiguity they provide is enhanced over the prior ABC keypad layout.

Figure 7:
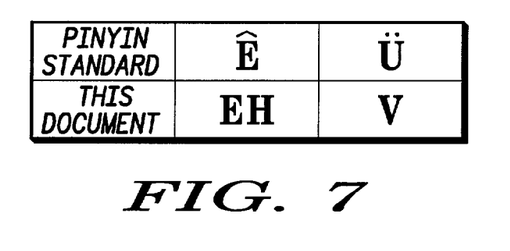
FIG. 7 is a view of two Pinyin symbols and their simplified replacement characters.

As mentioned, the Pinyin alphabet has the same twenty-six letter characters as the Roman alphabet. While most sounds in Mandarin Chinese, such as "bang" and "ying", are represented in Pinyin as combinations of plain Roman letters, two sounds are represented in Pinyin by diacritics or adding "hats" to plain Roman letters. Referring to FIG. 7, for simplicity herein, industry practice is followed by transcribing these hatted letters into EH and V, respectively.

Figure 2:
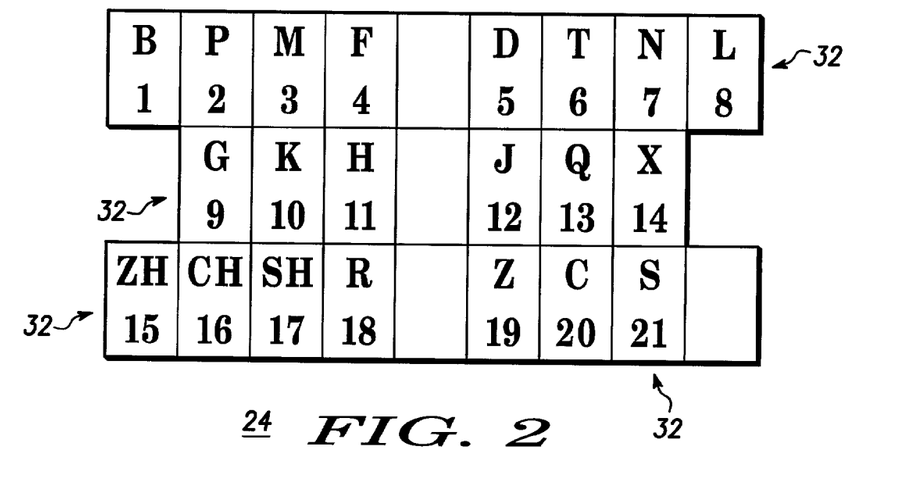
FIG. 2 is a view of a syllable initial group of symbols of the Pinyin alphabet, and commonly known ordered symbol sets thereof.
Figure 5:
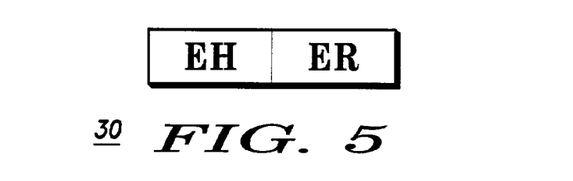
FIG. 5 is a view of syllable independent symbols of the Pinyin alphabet.
Figure 6:
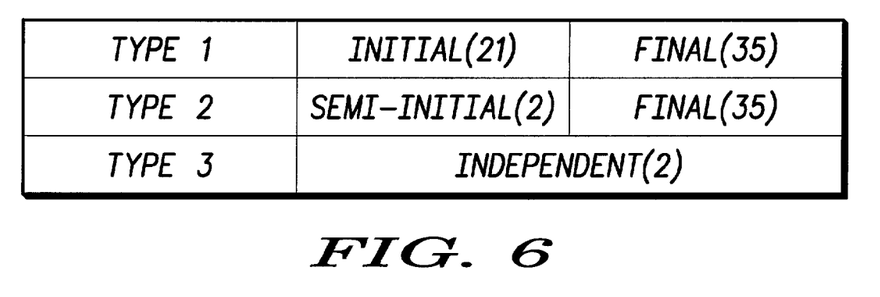
FIG. 6 is a table of the different syllable structures for forming syllables with the Pinyin symbols of the different symbol groups.

Chinese is a syllabic language with a simple and regular syllable structure, as can be seen by reference to the table of FIG. 6. In terms of the symbol groupings, the commonly used symbols 22 are organized by their location within the syllable so that there is either a syllable initial symbol group 24 (FIG. 2) or a syllable semi-initial symbol group 26 (FIG. 4) that are combined with a syllable final symbol group 28 (FIG. 3) to form the spellings used for Pinyin syllables. An independent symbol group 30 is shown in FIG. 5. The syllable initial symbol group 24 includes multiple smaller sets 32 of its symbols that are commonly known as being associated together. The syllable semi-initial symbol 26 and independent symbol group 30 have a smaller number of characters, i.e. two, so each has only a single set of its symbols. In addition, the symbols have a predetermined ordering in the syllable initial symbol group 24.

Figure 3:
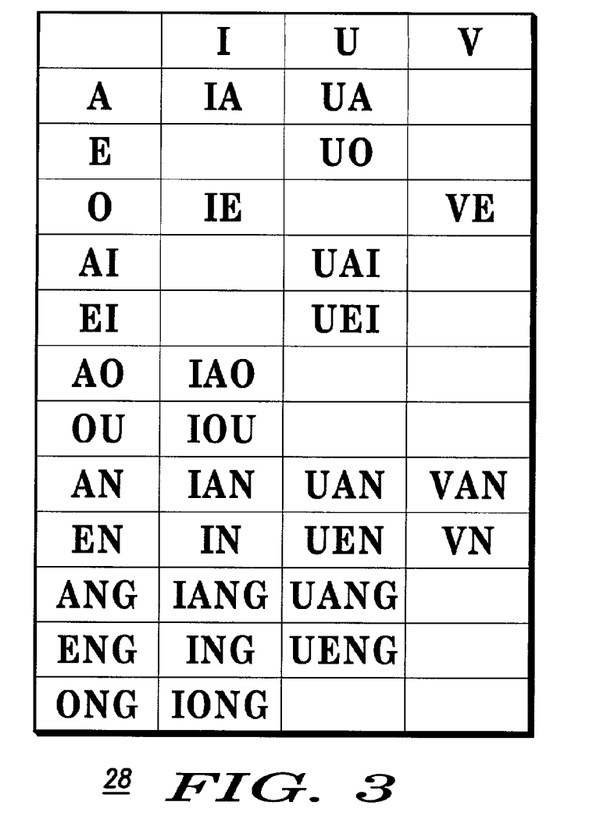
FIG. 3 is a view of a syllable final symbol group of the Pinyin alphabet.

On the other hand, the two-dimensional table arrangement of syllable final symbol group, i.e., Pinyin finals, 28 in FIG. 3 shows no obvious grouping and ordering of the group symbols. Nevertheless, it is unquestioned that for an educated native Chinese speaker, the six single character basic vowels can be intuitively grouped in two sets: A-O-E and I-U-V. It has been found that by spelling, all Pinyin final group 22 can be reduced in number to basic characters that include the above six basic single character vowels and the two nasal sounds represented by the characters N and NG. Together, the characters N and NG form a third set 32, which is an intuitive grouping as compared to the other basic characters that are vowels and due to the common character N that they share. It is these basic characters that are arranged on the keypad 12 in the layout 10 of FIG. 1, rather than all thirty-five symbols of the Pinyin final group 28 which would clutter the keypad 12 making a regular arrangement difficult and invariably lead to undesirable concentration of the Pinyin final group 28 causing input ambiguities in terms of achieving a minimum number of valid syllable candidates upon undertaking of predetermined sequences of key inputs.

Accordingly, the keypad layout 10 of FIG. 1 employs a top-down column based arrangement for the symbols of the syllable initial group 24 and a horizontal row-based arrangement for the basic characters parsed from the symbols of the syllable final group 28 to provide a keypad 12 that has a highly regular and efficient layout 10 which both optimizes the ability of the user to gain familiarity with the layout 10 for ease of use of the keypad 12 and minimizes multiple word formations via predetermined sequences of key inputs. For the syllable initial group 24, the symbol sets 32 are each assigned to a particular column 20. Further, the numerical order of the symbols in a set 32 corresponds to the number row 18 in which the symbols lie. More specifically and referring to the first symbol set 32 of the syllable initial symbol group 24 (B, P, M, F), this set 32 appears in the first, or leftmost column 34. The first symbol, B, appears in the first or topmost row 36; the second symbol, P, appears in the second row 38 immediately below the topmost row 36; the third symbol, M, appears in the third row 40 below the second row 38; and the fourth and last symbol, F, appears in the fourth or bottommost row 42 below the third row 40. The other symbol sets 32 have the same top-down ordered arrangement of their symbols in the key column 20 in which they lie.

The basic characters including the certain second group single character symbols, i.e. A, O, E, I, U and V, are split into three sets 32 which are arranged on a row-by-row basis in the layout 10, as previously described. As discussed, the three sets 32 for the basic characters are intuitive to a native speaker of Pinyin as two of the sets are the single vowel character symbols in the syllable final group 28 and the remaining set 32 is composed of the nasal sound characters, N and NG. In the illustrated and preferred keypad, in addition to the four rows 36–42 (FIG. 1) of keys 16, there are three columns of keys 16 including the first or leftmost column 34 followed by a middle key column 44 that is intermediate the left column 34 and a right end key column 46. Accordingly, each of the sets 32 for the basic characters of the syllable final group 28 can be arranged in its own row 18 of keys 16 as there is no symbol set 32 with a greater number of symbols than the number of keys 16 in a row 18. In fact, because of the small number of basic characters to which the symbols of the syllable final group 28 has been reduced, the basic characters only need to appear in the first three rows 36–40 leaving the bottom row 42 free of any basic characters derived from the syllable final group.

As shown in FIG. 1, the first set 32 of basic characters (A, O, E,) is arranged on the keys 16 in the top row 36 in a left-to-right fashion, the second set 32 of basic characters (I, U, V) is arranged on the keys 16 in the second row 38 in a left-to-right fashion, and the third set 32 of basic characters (N, NG) is arranged on the keys 16 in the third row 40 and more specifically, keys 16 in the left column 34 and the right column 46 of the third row 40. As is apparent, the use of the basic characters greatly reduces the concentration of the syllable final group symbols that need to appear on the keypad 12 and, to this end, there are no keys 16 that include more than a single basic character or symbol from the syllable final group 28. This greatly reduces the ambiguities that can be created by over concentration of the syllable final group symbols on the keys 16, as previously discussed. Further, the natural grouping of the basic characters derived from the symbols of the syllable final group 28 into the above-described sets 32 along with the row-based placements on the keypad 12 affords improved regularity to the layout 10 so that a user can readily become familiar with the location of the basic characters in the keypad 12 to optimize their speed of input with continued use thereof.

As previously mentioned, Chinese is a highly structured language with a regular syllable structure, as can be seen in the table of FIG. 6. With respect to the Type-2 syllables formed from symbols including the Pinyin dummy or so called semi-initial symbols 26, there are certain conventions in place so that the Type-2 syllables with no consonant initial look more like a Type-1 syllable that includes consonant initials from the syllable initial symbol group 24.

More specifically, if the final symbol is composed of the vowel character I followed by other characters, the character I should be replaced with the character Y. The single character or isolated syllable I is written as YI. If the final symbol is single character vowel U followed by other characters, replace U with W. Single character or isolated syllable U is written as WU. If the final symbol is single character vowel V followed by other characters, replace V with Y. Single character or isolated syllable V is written as YU. If the final symbol is single character vowel A, O or E followed by other characters, its syllable representation is the same as that of the final symbol.

Figure 8:
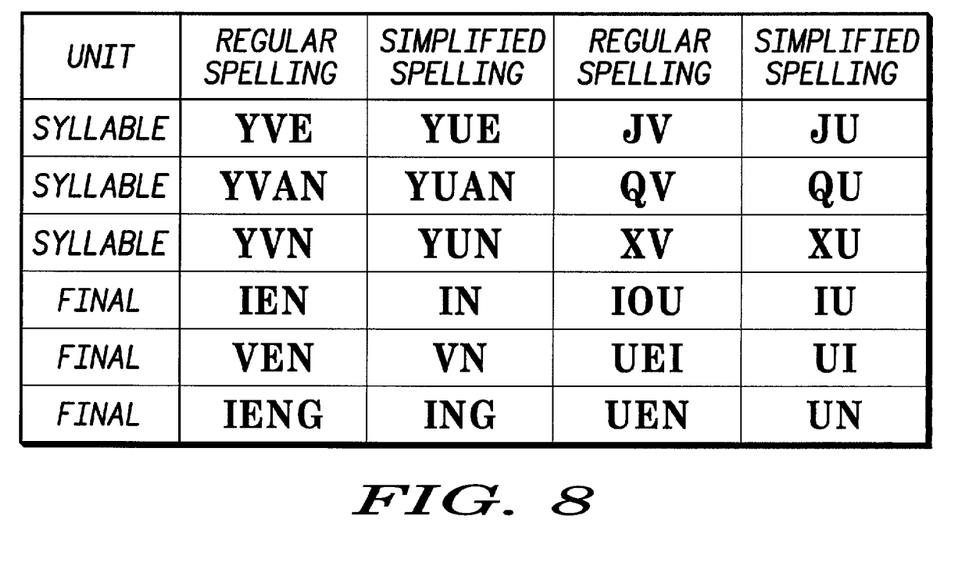
FIG. 8 is a table of simplified spellings for various Pinyin syllables and syllable final symbols.

Further, the Pinyin standard also includes several exceptions to the above-described rules of syllable construction, as set forth in the table of FIG. 8. For example, Type-2 syllable VE is to be written as YUE instead of YVE as would normally be expected from the general rule of adding Y, that is set forth in the FIG. 4 table. Another simplification shown in the FIG. 8 table incorporated in the Pinyin final symbol table of FIG. 3 is symbol IENG which is simplified to ING. Five other final symbols and their simplifications are also shown in the FIG. 8 table.

Figure 4:
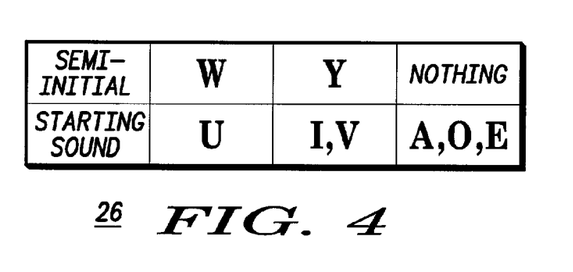
FIG. 4 is a view of a syllable semi-initial symbol group of the Pinyin alphabet and the corresponding sounds of the symbols.

Referring to the table of FIG. 4, the syllable semi-initial symbol group 26 is made up of a set 32 of two symbols 22 which are employed for Type-2 Pinyin syllables only based on the starting character or sound for the following Pinyin final symbol. Similarly, the two independent or isolated Type-3 syllables (EH and ER) are listed in Pinyin standard in the table of FIG. 5. Since there are only two symbols in the syllable semi-initial group 26 and the independent syllable group 30, all of these symbols are placed on a single key 16 in the bottom row 42 and the middle key column 44.

The keypad layout 10 of FIG. 1 is advantageous in another respect unrelated to regularity and efficiency; namely, the layout 10 is functionally compatible with keypad layouts that use the asterisk and pound keys 16 in the bottom row 42 and left column 34 and right column 46, respectively, as left and right cursor or navigation keys. In other words, in a hand-held wireless electronic device 14 such as depicted in FIG. 23, certain of the keys 16 of the keypad 12 can be employed by a user to traverse to different portions of display screen 48 of the device 14. This arrangement is typically found in those devices 14 where a separate navigation key 50 that is distinct from the keys 16 of the keypad 12 is not available. Herein, the keypad layout 10 utilizes all twelve keys 16 of the keypad 12 while still retaining the functionality of the navigation keys in the keypad 12 as none of the keys 16 in the bottom row 42 are assigned symbols from the syllable final symbol group 28. Instead, only initial symbols from the groups 24, 26 and 30 are assigned to the bottom row keys 16, as discussed above. Since one of these symbols has to be entered before candidate selection via the cursor keys and/or tone input via the zero key can occur, all three keys 16 in the bottom row 42 can preserve their conventional functions for candidate navigation and tone input. In other words, because a key 16 other than one in the bottom row 42 has to be used before a syllable or word is completed, there will be no incompatibilities in applications employing the different functions for the keys 16 of the bottom row 42.

Using the keypad layout 10 of FIG. 1, any Pinyin syllable can be addressed with at most four key inputs: one key input for the Pinyin initial symbol and up to three key inputs for the Pinyin final symbol. For example, in contrast to the ABC keypad where six key inputs are required to address the Pinyin syllable "zhuang", only four key presses are required with the keypad layout 10. A further improvement in efficiency relates to the fact that, in general, there are at most three candidates that can be formed for any predetermined sequence of key inputs. In fact, in over 90% of the instances, there are only one or two candidates for a predetermined sequence of key inputs. The only exception is the zero key where there are four candidates; however, the independent syllable symbol EH can in effect be disregarded as it is rarely ever used. This is a significant efficiency improvement over the standard ABC keypad where it is not uncommon to have five or six different candidates for a particular key combination.

As can be seen in FIG. 1, the numeric key seven includes both the symbol N from the syllable initial group 24 and the basic character N derived from the syllable final group 28. It is desirable to have this key sharing so as to avoid confusion between use of the identical characters in the different symbol groups. With the syllable initial symbol group 24 having a column-based arrangement such that the syllable initial symbol N is on key seven, it was found desirable to have the sets 32 of the basic characters be placed in a row-based arrangement in the keypad 12 so that there could be key sharing between the common character N which is also one of the basic characters derived from the syllable final group 28.

While the keypad 12 is preferably for use in a wireless, hand-held electronic device 14, it will be recognized that the layout 10 herein can also be implemented in a alphanumeric keypad 12 such as is provided on a desktop or laptop computer in addition to the main symbol input keys for two-handed input. In these devices 14, underlying circuitry is provided in a housing for interpreting the data input via the keypad 12 and can include a microprocessor 52 and a memory 54. The memory 54 can store dictionary tables of the different syllables and words of the Pinyin phonetic language and be programmed with software such that when a given sequence of key inputs is undertaken via the keypad 12, the software will retrieve all valid syllable candidates from the stored dictionary table in the memory 54. It should be noted that the sequence can be a single keystroke where symbols 22 stand alone as self-contained syllables, i.e. syllable Type-3 in FIG. 6. These syllable are then combined to form words which are shown on the display 48 on the device housing under control of the microprocessor 52.

The keypad layout 10 of FIG. 1 is improved over the ABC keypad in terms of its combination of regularity and efficiency, as been described. However, up to four keystrokes can be required to address a Pinyin syllable. Alternative keypad layouts are also disclosed herein that incorporate some minor differences over the keypad layout 10 to maintain regularity and low input ambiguity, while ensuring that at most three keystrokes are required for addressing any valid Pinyin syllable.

Figure 9:
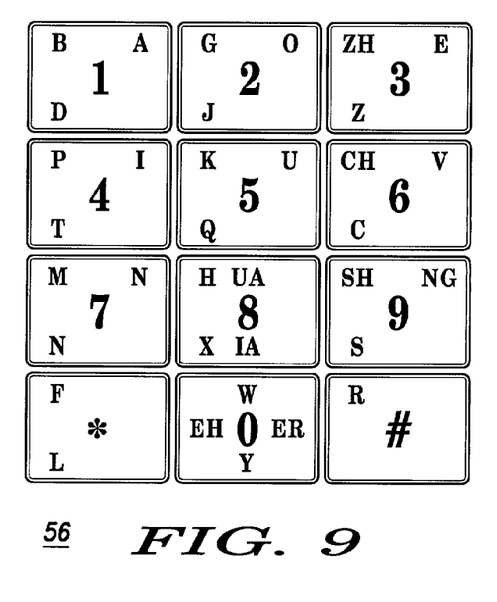
FIG. 9 is a plan view of an alternative keypad layout for the Pinyin alphabet in accordance with the present invention having IA and UA final compound symbols arranged on the same key.

One alternative layout 56 is shown in FIG. 9. As can be seen, the layout 56 differs from layout 10 by way of the addition of the pair of double character compound symbols IA and UA from the syllable final group 28. In the layout 56, these compound symbols are provided on the same key in the third row 40 and middle column 44 of the keypad 12 which in the keypad layout 10 was devoid of any of the basic characters including the certain symbols derived from the syllable final group 28.

Figure 10:
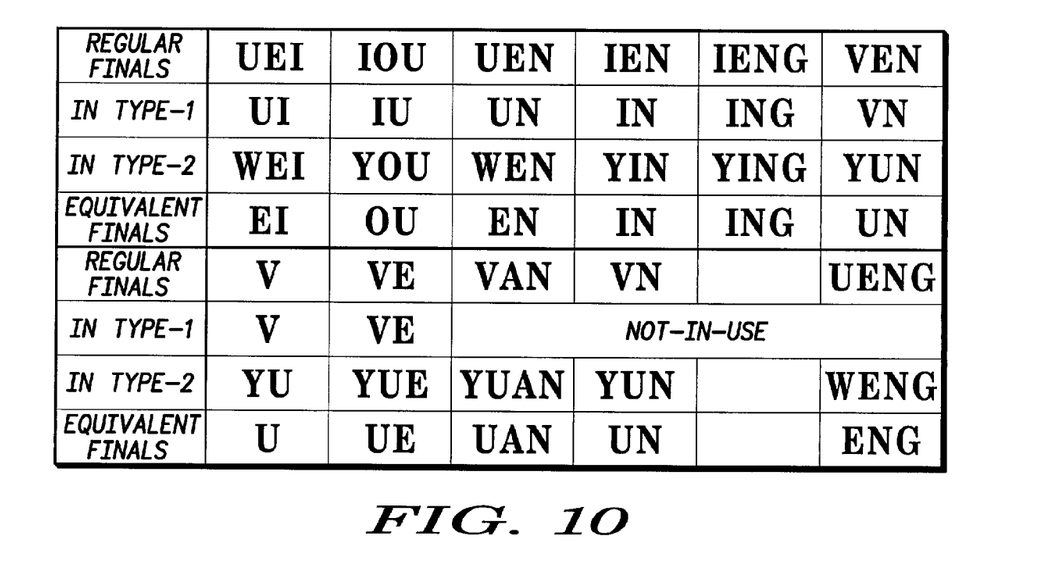
FIG. 10 is a table of the syllable final symbols with simplified spellings for corresponding Type-1 syllables and equivalent spellings for corresponding Type-2 syllables.

As earlier mentioned, there are dozens of cases where regular Pinyin spelling defined by Pinyin conventions or standards gave way to simplified spellings, such as discussed earlier with respect to the table of FIG. 8. In this table it is shown that the Pinyin final symbol UEI should be spelled as UI in Type-1 syllables (syllables with symbols from both syllable initial group 24 and the syllable final group 28). However, as dictated in the table of FIG. 10, the Type-2 spelling of the same Pinyin final UEI gives way to an equivalent spelling UI. The FIG. 10 table shows all such spelling equivalents for Pinyin final symbols.

Figure 11:
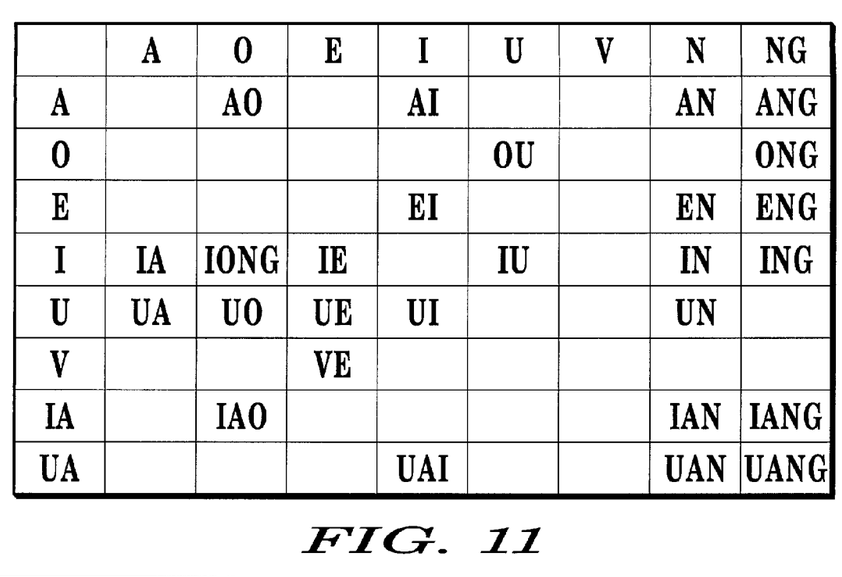
FIG. 11 is a table of the Pinyin final symbols taking into account the simplified spellings and equivalent spellings set forth in the table of FIG. 10.

After replacing regular Pinyin final symbols with their spelling equivalent Pinyin final symbols, all the Pinyin final symbols set forth in the table of FIG. 3 can be rearranged into the table of FIG. 11. The FIG. 11 table reveals that with one exception all Pinyin final symbols are either in the set of the symbols: A, O, E, I, U, V, IA and UA; or can be formed from symbols in the above set of symbols combined with the basic characters including the certain symbols discussed above with respect to layout 10, that is the set of: A, O, E, I, U, V, N and NG. The only exception is the Pinyin final symbol IONG which can be readily simplified by I followed O since IO is the first two characters of this compound symbol but not a valid Pinyin final symbol standing alone. In short, by introducing IA and UA as compound symbols, any Pinyin final symbol can be written as one or two characters or symbols from the basic character set: A, O, E, I, U, V, N, NG, IA and UA. Accordingly, by assigning IA and UA to the keypad 12, it is possible to address any Pinyin syllable with no more than three keystrokes.

It is worth noting that the bottom two lines in the table of FIG. 11 are only accurate by spelling but they are not linguistically (phonetically and phonologically) meaningful. For example, Pinyin final symbol IAN is formed by the compound character IA followed by the single character N. On the other hand, its more correct decomposition from a linguistic standpoint should be the sound represented by the single character I followed by the sound represented by the character string AN.

The keypad layout 56 arranges the symbols IA and UA from the syllable final group 28 on the single, middle key 16 in the third row 40, as previously mentioned. Thus, the keys 16 of the bottom row 42 are still devoid of the basic characters derived from the syllable final group 28 including certain of the symbols thereof including the compound symbols IA and UA. In this manner, the layout 56 preserves compatibility with those keypads employing only keys in the top three rows 18 for text data input. The keypad layout 56 is named HuaXia as this spelling is obtained from the symbols on the third row, middle key and forms a word in Chinese Pinyin that means "China" so as to make the layout 56 easy to remember.

Figure 12:
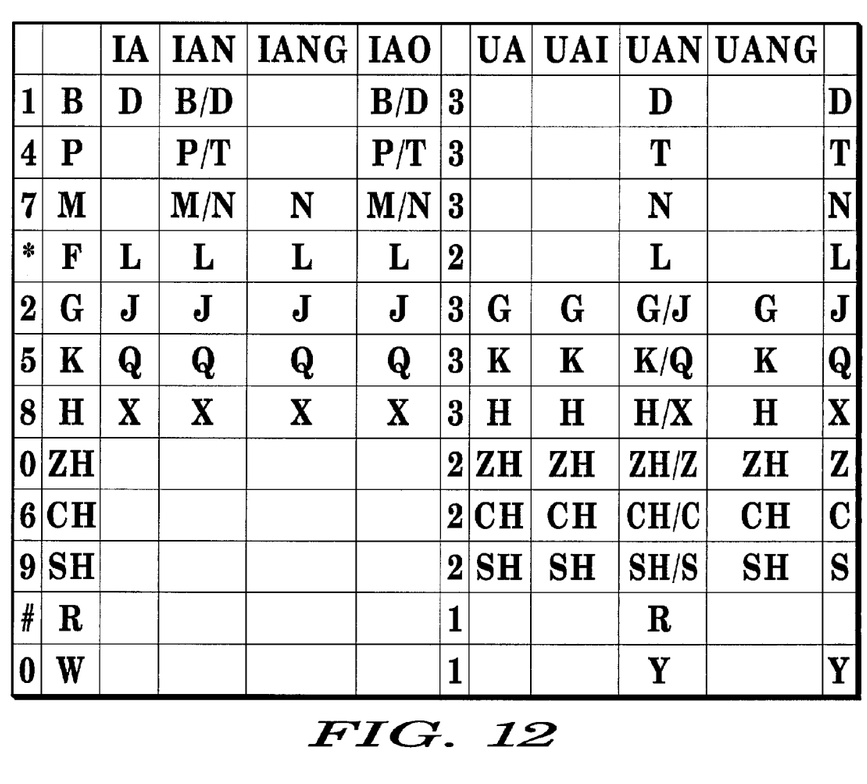
FIG. 12 is a table showing all possible syllable combinations composed of Pinyin initial symbols and Pinyin final symbols starting with IA or UA using the keypad of FIG. 9.

The table of FIG. 12 shows all valid combinations of Pinyin initials followed by Pinyin finals that start with either of the compound symbols IA or UA added to the layout 56. The table has all the Pinyin initials ordered 1–4, 9–11 and 15–18 (FIG. 2) on the left vertical axis and the remaining Pinyin initials ordered 5–8, 12–14, and 19–21 (FIG. 2) on the right vertical axis. The semi-initials W and Y are at the bottom of respective left and right vertical axes. The table also indicates on which key of keypad layout 56 the initial or semi-initial symbol appears. The final symbols that start with the symbols IA and UA, as well as these symbols themselves, are placed across the top horizontal axis of the table on either half thereof. So, for example, both Pinyin initials B and D are valid when preceding Pinyin final LAN, but only Pinyin initial D is valid when preceding Pinyin final IA.

Thus, based on the table of FIG. 12, if IA and UA are assigned to the same key 16, a predetermined key sequence that includes pressing a key 16 associated with a Pinyin initial symbol followed by the IA/UA key will generate at most three different Pinyin syllable candidates. For example, Pinyin syllables BIA, DIA, and DUA are all addressed by the input of the B/D(key one) followed by the IA/UA(key eight). Accordingly, as seen in the FIG. 12 table, the candidate distribution is as follows: six cases with three candidates, four cases with two candidates and two cases with one unique candidate. The average number of candidates is therefore 2.33 when using the key 16 associated with IA/UA in the layout 56.

In summary, the HuaXia keypad layout 56 is compatible with any nine-key keypad layout, requires at most three keystrokes addressing any Pinyin syllable, produces at most three Pinyin syllable candidates for any keystroke sequence (with the exception of sequences including key zero), and generates no confusion between the different implementations of the character N as a symbol from the syllable initial group 24 and as a basic character derived from the syllable final group 28. In short, the HuaXia keypad layout 56 incorporates all the advantageous features of the layout 10 while further being able to address any Pinyin syllable with at most three keystrokes. In addition, the placement of the symbols IA and UA on the same key 16 generates at most three syllable candidates for syllables including those symbols.

Figure 13:
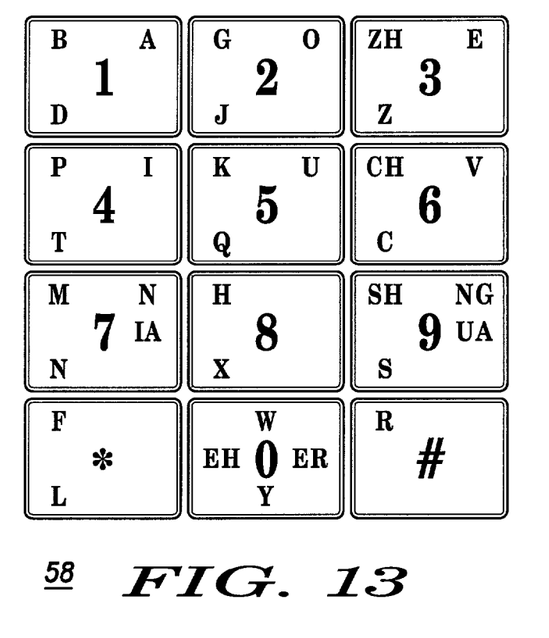
FIG. 13 is a plan view of another alternative keypad layout for the Pinyin alphabet in accordance with the present invention having IA and UA arranged on different keys.

FIG. 13 is directed to another keypad layout 58 similar to keypad layout 56 except separating the double character or compound character symbols IA and UA onto separate keys 16 to reduce ambiguities. At the same time, placement of the characters IA and UA on the bottom row 42 of keys 16 is avoided to preserve compatibility with the conventional nine-key keypad, as has been discussed. It had been found that it is desirable to avoid placement of the symbols IA and UA on any of the keys 16 numbered one through five as this would introduce too much ambiguity into the layout 58. While it is statistically preferable to use keys six and eight for the lowest possible ambiguity, the layout 58 accompanies IA with N on key seven and UA with NG on key nine for maximizing keypad regularity while still maintaining low ambiguity.

The keypad layout 58 is named NianShuang for highlighting the fact that the symbols N, IA, N share one key and the symbols SH, UA, NG share another key. Also, the term NianShuang means "double reading" in Chinese, which provides a fairly good representation of the nature of this keypad layout 58 to make it easy to remember as there are now double the number of keys for IA and UA than in the keypad layout 56.

Figure 14:
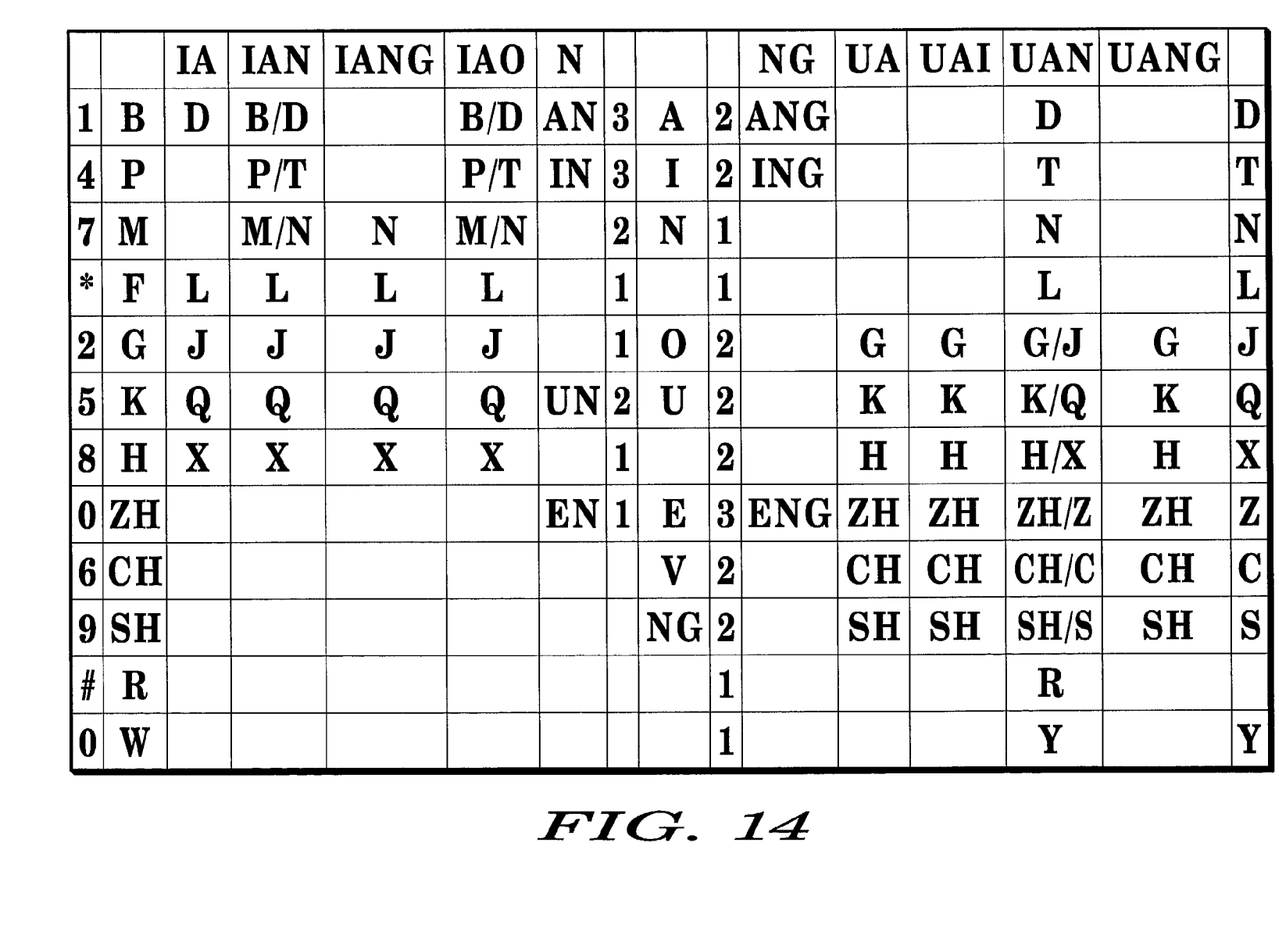
FIG. 14 is a table showing all possible syllable combinations having as components Pinyin initial symbols and Pinyin final symbols starting with either IA or UA using the keypad of FIG. 13.

The arrangement of the basic characters in the layout 58 is statistically improved over the layout 56 where IA and UA are placed onto the same key, as evidenced by the table of FIG. 14. The FIG. 14 table has the same symbols along the left and right vertical axes thereof as the FIG. 12 table. However, the top horizontal axis is split since the symbols IA and UA are on different keys, with the left half including a column for the character N of the basic characters that shares key seven with IA and the right half including a column for the basic characters NG that share key nine with UA. So, for example, among all the twenty valid key combinations affected, there are only three cases with three valid syllable candidates, nine cases with two valid syllable candidates and eight cases with a unique candidate. The average number of candidates is 1.75 when using the keys 16 associated with IA and UA in the layout 58.

Figure 15:
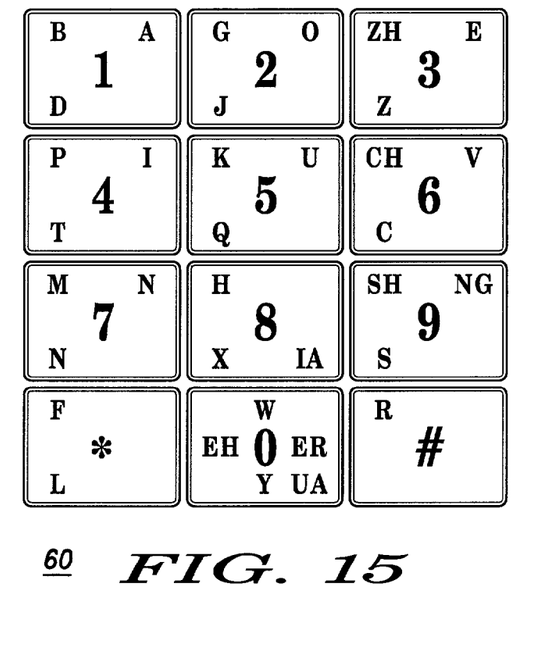
FIG. 15 is a plan view of another alternative keypad layout for the Pinyin alphabet in accordance with the present invention having IA and UA arranged on different keys that do not include other syllable final symbols.

FIG. 15 depicts keypad layout 60 which is similar to layout 58 in terms of having the double character compound symbols IA and UA on separate keys; however, the layout 60 utilizes different keys 16 for this purpose. In the layout 58, two keys (key seven and key nine) are assigned two of the Pinyin final basic characters while some other keys, such as digital keys eight and zero, are assigned none of the Pinyin final basic characters. The keypad layout 60 takes advantage of keypad 12 where the zero key is available for text input, and thus assigns IA and UA to key eight and key zero, respectively, which, as mentioned, are two of the keys 16 lacking Pinyin final basic characters. Accordingly, in those cell phones for instance where key zero has additional functionality such as tone selection and letter case switching, layout 60 would not be optimized in comparison to the earlier described layouts absent redesign or reconfiguration of the phone circuitry to allow for text input via key zero, such as available on many Japanese cell phones where all ten digital keys are available for text input. It is in these types of phones that keypad layout 60 can be most advantageously employed.

Figure 16:
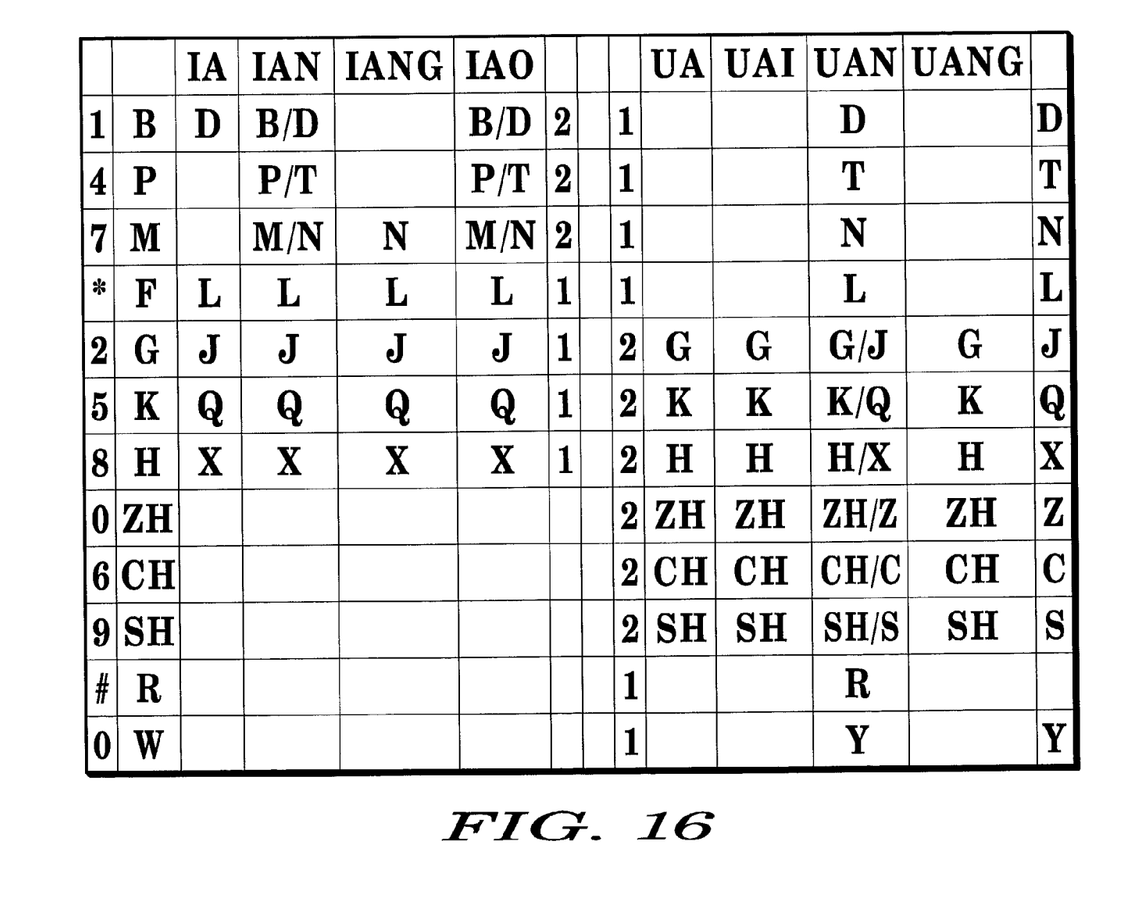
FIG. 16 is a table of all possible syllable combinations composed of Pinyin syllable initials and Pinyin syllable finals starting with IA or UA using the keypad of FIG. 15.

This layout 60 is statistically improved over the layouts 56 and 58 where IA and UA are on the same key or IA and UA are on keys with other basic characters (N and NG, respectively), as evidenced from the table of FIG. 16. The FIG. 16 table has the same symbol arrangement on the respective axes thereof as the FIG. 12 table. So, for example, among all the nineteen valid key combinations affected, there are no instances where three valid syllable candidates are generated. There are nine cases with two valid syllable candidates and ten cases with a unique candidate. Therefore, the average number of candidates is 1.40 when using the keys 16 associated with IA and UA in the layout 60.

Further improvements can be made to the layout 10,56,58 and 60 where a navigation key 50 separate from the keypad 12 is provided, as shown in FIG. 23. In this instance, the entire bottom row 42 of keys 16 can be utilized for further improving input efficiency and enhancing keypad regularity. Further, as has been mentioned, Pinyin final syllable decompositions related to IA and UA symbols as shown in the table of FIG. 11 are only accurate by spelling (orthography) but not by linguistics (phonetics and phonology). For example, Pinyin final syllable IAN is not accurately enunciated by the sound represented by the character string IA followed by the sound represented by the character N. Instead, its somewhat correct decomposition should be the sound represented by the single character I followed by the sound represented by the character string AN. While this kind of inaccuracy for purely spelling-based text input is harmless as it does not distort any Pinyin spelling, it may be undesirable in that it can cause some people to reject use of such keypad layouts for this reason alone.

Use of the double character compound symbols IA and UA as basic characters derived from the syllable final group 28 can also cause some confusion as there are two different ways to enter the symbols. One is by directly addressing the key having the symbols thereon with a single keystroke, and the other is to treat them as combinations of individual characters and thus to input them by using two keystrokes. For instance, with the HuaXia keypad layout 56, the symbol IA can be entered either by pressing key four followed by key one, or by key eight alone.

Figure 17:
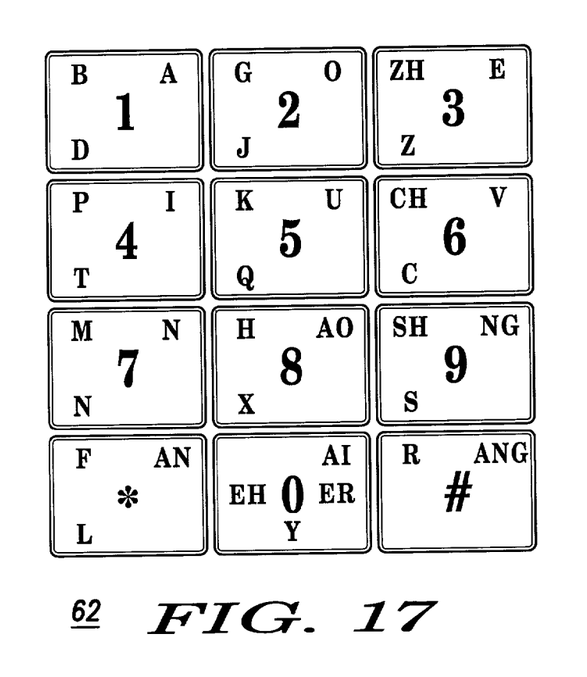
FIG. 17 is a plan view of an alternative keypad layout for the Pinyin alphabet in accordance with the present invention having syllable final compound symbols starting with the character A thereon.
Figure 18:
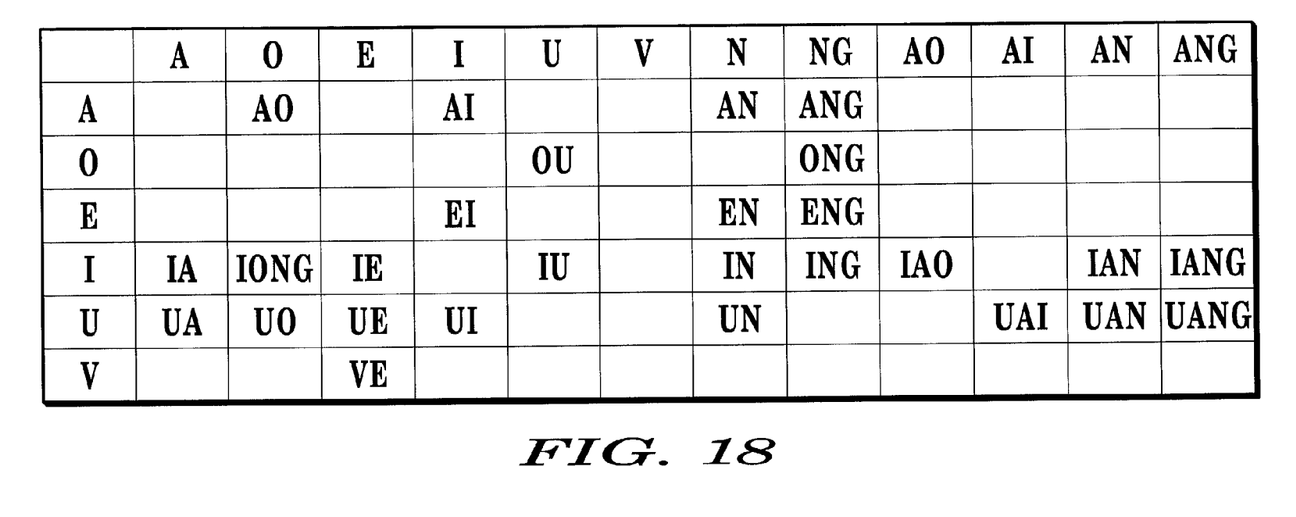
FIG. 18 is a table of the Pinyin final symbols showing the various compound symbols thereof including those starting with the character A.

To address some of these issues, keypad layout 62 shown in FIG. 17 adds more than two compound character symbols to the keypad 12. Accordingly, the keypad layout 62 utilizes preselected basic characters that include a single character symbol, the character of which is an initial character of compound character symbols of the syllable final group 28. In particular, the keypad layout 62 adds all Pinyin final symbols that start with the single character symbol A to the keypad 12: AO, AI, AN and ANG. The table of FIG. 18 rearranges the FIGS. 3 and 11 tables of Pinyin final symbols to show that they are composed of a symbol in the set: A, O, E, I, U, V, or a string of a symbols from the above set followed by a symbol or basic characters (N, NG) from the set: A, O, E, I, U, V, N, NG, AO, AI, ANG. Again, the compound symbol IONG is an exception.

The layout 62 maximizes the use of the keys 16 for the basic characters derived from the syllable final group 28 as the symbols AN, AI, and ANG appear on the three keys in the bottom row 42 as shown with symbol AO appearing on key eight in the third row 40. Referring to key eight and key zero, the keypad layout 62 is called "HaoWai" which means "extra" in Chinese and which gives a fairly good representation of the nature of the keypad layout 62 relative to the other layouts, and in particular the first described layout 10 as there are additional basic characters over that used in these layouts.

The keypad layout 62 also provides desirable regularity in that the symbols AN and ANG are assigned to keys 16 in the bottom row 42 that are immediately below the keys in the third row 40 including the basic characters N and NG so as to provide parallelism between the characters appearing in the two rows 40 and 42 in the left and right-most columns 34 and 46 thereof.

While the keypad layout 62 incorporates the advantages of the keypad layout 10, it further provides advantages in terms of utilizing all twelve keys of the keypad 12 and being able to address any Pinyin syllable in at most three keystrokes and generating at most three alternative valid syllable candidates with the exception of the zero key, as previously mentioned. While, expanding off the Pinyin final symbol A to form the keypad layout 62 generates the same multiple spelling confusion problem for the compound character symbols AO, AI, AN and ANG as does the layouts 56–60 utilizing the compound character symbols IA and UA, it reduces linguistic inaccuracies in Pinyin final symbol decompositions and improves keypad utilization.

Figure 19:
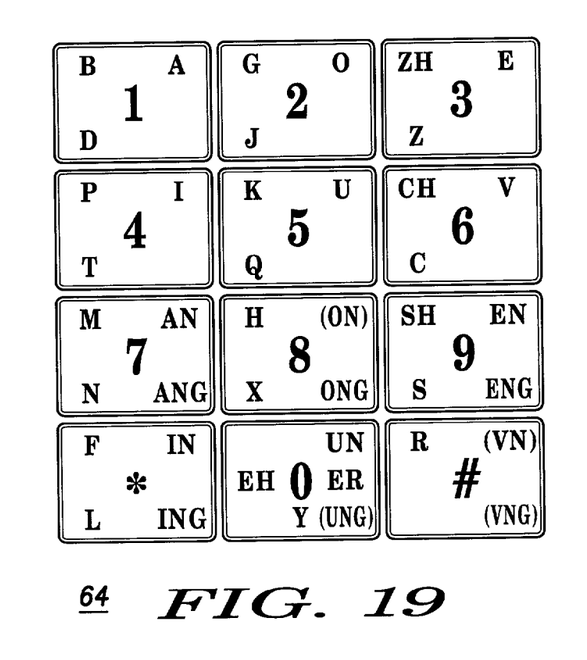
FIG. 19 is a plan view of another alternative keypad layout for the Pinyin alphabet layout in accordance with the present invention having syllable final compound symbols ending with the character N or characters NG thereon.
Figure 20:
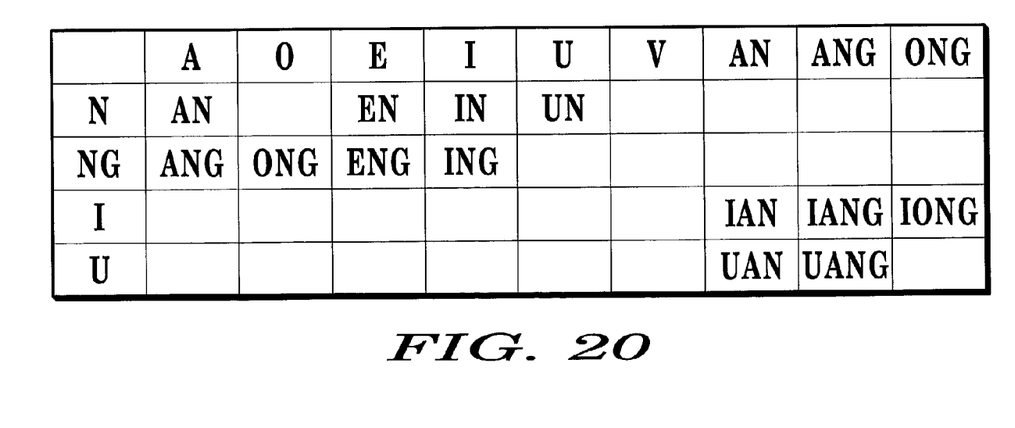
FIG. 20 is a table of the Pinyin final symbols that include N or NG as components.

Another keypad layout 64 is shown in FIG. 19 which is based on expanding the basic characters derived from the syllable final group 28 off of the single character N and the double character NG. The table of FIG. 20 shows all Pinyin final symbols containing N or NG, and highlights those eight selected as the basic characters for the layout 64. The preselected basic characters are all the two-segment Pinyin final symbols with these two sounds represented by N and NG independent of other characters (see FIG. 3 table). More particularly, the single character N and the double character NG are the final characters for three different single character symbols from the syllable final group 28 and thus are placed on the keys 16 in the bottom two rows 40 and 42 of the keypad 12. In this manner, similar to layout 62, the layout 64 maximizes the use of the keys 16 that are utilized for text input.

To this end, the symbols expanded off of the characters N and NG are arranged in the bottom two rows 40 and 42 in the same vowel-based pattern as the single vowel character symbols of the basic characters that appear on the keys 16 in the top two rows 36 and 38. Accordingly, the expanded N and NG symbols are located in the same column 20 and offset by one row 18 from the key 16 in the upper two rows 36 and 38 having the single vowel character symbol thereon that is a component thereof. To better illustrate this general parallelism in the vowel-based patterns of the basic character in the keypad layout 64, FIG. 19 shows in parenthetical additions to the keys where certain symbols otherwise not included in the layout 64 would appear if there were a perfect balance between the top two rows 36 and 38 and the bottom two rows 40 and 42. However, as will be appreciated, the parenthetical symbols are non-existent in the Pinyin language and are only included to illustrate the parallelism described herein.

As can be seen in FIG. 19, the keypad layout 64 is called "ManShen" from the symbols in the third row 40 and the leftmost and rightmost columns 34 and 46. "Manshen" means "whole body" in Chinese which is fairly informative with respect to the keypad layout 64 due to the balance this layout manifests, as described above.

Some of the characteristics of the keypad layout 64 include the lack of any distinction between N and NG as in the prior layouts. That is, AN and ANG share one key, EN and ENG share another key, and IN and ING share yet another key. Further, and as has been discussed, there is a general one-to-one correspondence between each key in the upper two rows 36 and 38 and each key 16 in the lower two rows 40 and 42 such that the key correspondences are key one to key seven, key two to key eight, key three to key nine, key four to key *, key five to key zero, and key six to key #. The symbols including the N and NG characters are only assigned to keys 16 in the lower two rows 40 and 42, but are not assigned to any of the upper two rows 36 and 38 of keys 16. And, the upper two rows 36 and 38 of keys and the lower two rows 40 and 42 of keys 16 have the same pattern of vowel assignments. That is, the first and third rows 36 and 40 each include the A, O and E, in that left-to-right order, and the second and fourth rows 38 and 42 each include I, U and V, in that left-to-right order.

As is apparent, the assignment described above makes the key layout 64 predictable and regular. For example, as key seven corresponds to key one, and key one is assigned A, key seven will be assigned the character A followed by N and NG. Again, for demonstrating this regularity, non-existent Pinyin finals ON, UNG, VN and VNG are also shown in parenthetical in FIG. 19.

Figure 21:
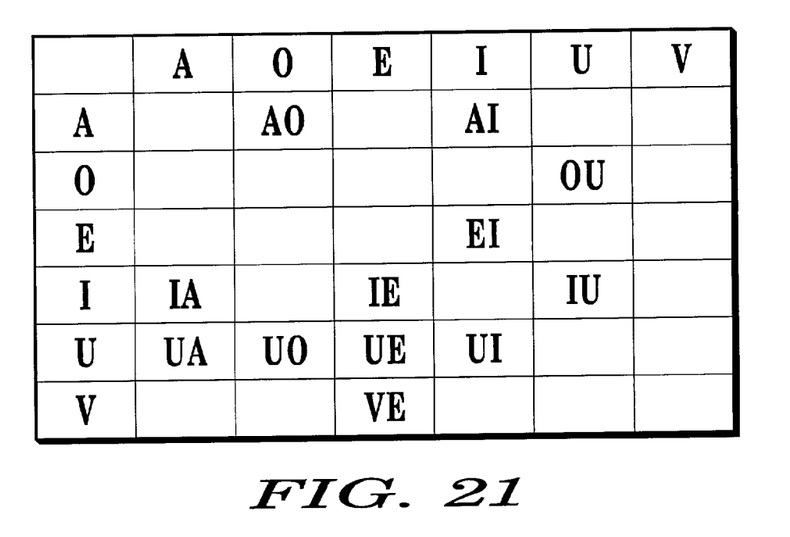
FIG. 21 is a table showing all two-character Pinyin final symbols that do not have N or NG as components.
Figure 22:
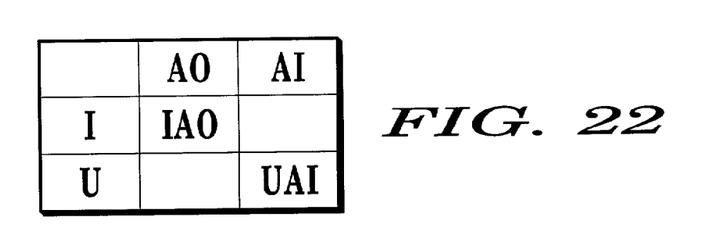
FIG. 22 is a table showing all three-character Pinyin final symbols without N or NG as components.

To explore the further characteristics of the keypad layout 64, all Pinyin final symbols without the characters N and NG are shown in the tables of FIGS. 21 and 22. As can be seen, by adding only Pinyin final symbols ending with the characters N and NG to the keypad layout 64, all Pinyin syllables with the Pinyin final symbols IAO and UAI have to be entered in four keystrokes. Otherwise, compared with the other keypad layouts described earlier, keypad layout 64 has a lower average number of keystrokes for addressing a Pinyin syllable, although it generates a higher average number of valid syllable candidates (i.e., creates more ambiguities). In addition, the # key is still not assigned a Pinyin final basic character and thus can still be used for other functions such as Pinyin candidate navigation.

Figure 24:
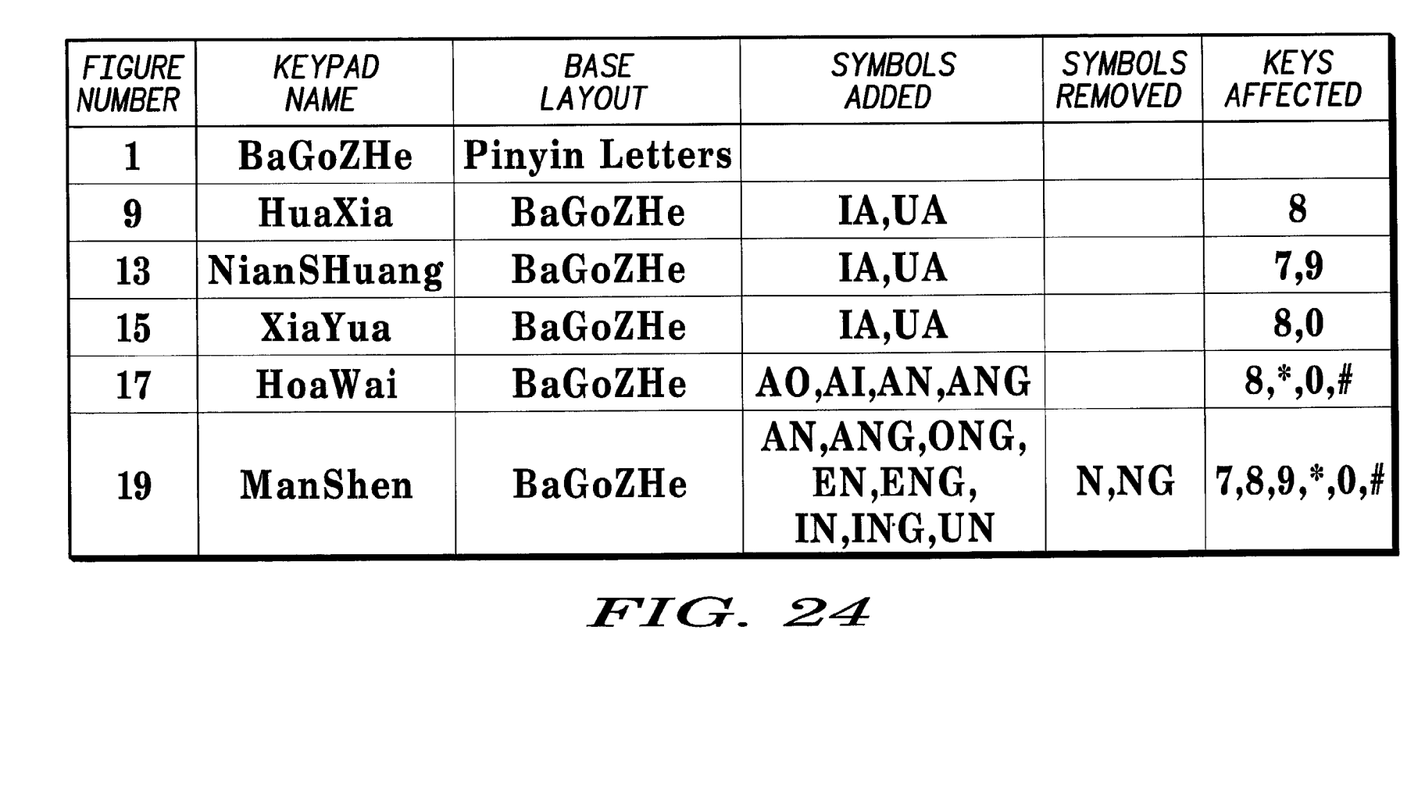
FIG. 24 is a table showing a summary of features of the keypad layouts of FIGS. 1, 9, 13, 15, 17 and 19.

In summary, the Pinyin keypad layout 10 described herein has the Pinyin symbols arranged thereon in an intuitive manner to provide the layout with regularity, and has the Pinyin symbols distributed in an efficient manner so as to minimize the number of multiple words formed from predetermined keystroke sequences, and also to limit the number of keystrokes necessary to address a Pinyin syllable. Five alternative keypad layouts 56–64 are also described that are modified from layout 10 along three different directions; adding IA and UA (layouts 56,58 and 60), expanding off of symbol A (layout 62), and expanding off of characters N/NG (layout 64). These alternative provide advantages in terms of regularity and efficiency in that most can be used to enter Pinyin symbols with no more than three keystrokes while generating a maximum of three valid syllable candidates with a predetermined sequence of key inputs. To this end, the alternative layouts maximize utilization of the keys 16 in the keypad 12 to achieve these advantages. The table of FIG. 24 summarizes the differences of the alternative keypad layouts 56–64 over the layout 10.

What is claimed is:

1. A keypad layout for a hand-held electronic device comprising:
   a plurality of keys, including keys "1" through "9" and "0", configured for data entry of numbers and symbols of a Romanized Chinese phonetic alphabet, each key representing at least one symbol of a syllable initial symbol group or a syllable semi-initial symbol group of the Romanized Chinese phonetic alphabet,
   wherein all keys representing symbols of the syllable initial symbol group are grouped separate from all keys representing symbols of the syllable semi-initial symbol group.

2. The keypad of claim 1, wherein the plurality of keys includes keys "*" and "#".

3. The keypad of claim 1, wherein one key of the plurality of keys is solely designated for symbols of the semi-initial symbol group.

4. The keypad of claim 1, wherein at least a portion of the plurality of keys represents symbols of a syllable final symbol group.

* * * * *